United States Patent [19]

Connelly

[11] 4,037,978

[45] July 26, 1977

[54] RESILIENT SWIVEL CONNECTOR

[75] Inventor: Brian W. Connelly, Toronto, Canada

[73] Assignee: B.C. Investments Ltd., St. Helier, Guernsey (Channel Is.)

[21] Appl. No.: 604,715

[22] Filed: Aug. 14, 1975

[30] Foreign Application Priority Data

Aug. 23, 1974 United Kingdom ............... 37200/74
Dec. 16, 1974 United Kingdom ............... 54283/74

[51] Int. Cl.² .............................................. F16D 1/12
[52] U.S. Cl. .................................... 403/164; 35/18 A; 46/29
[58] Field of Search .......................... 403/164, 331, 97; 46/28, 29; 63/DIG. 3; 285/190, 280, DIG. 22; 35/18 A, 53, 60

[56] References Cited

U.S. PATENT DOCUMENTS

| 639,765 | 12/1899 | Phipps | 403/97 X |
| 1,740,740 | 12/1929 | Little | 403/164 |
| 2,729,473 | 1/1956 | Warshawsky | 285/280 X |
| 2,942,356 | 6/1960 | Weintraub | 35/18 A |
| 3,066,501 | 12/1962 | Charles et al. | 35/18 A X |

FOREIGN PATENT DOCUMENTS 918,566 2/1963 United Kingdom ................. 403/164

Primary Examiner—Wayne L. Shedd
Attorney, Agent, or Firm—Sim & McBurney

[57] ABSTRACT

This invention provides a swivel coupling including two portions each capable of rotational movement with respect to the other. Each portion includes a bore at an angle to the axis of swiveling, and each bore is adapted to receive and mold in place an elongated member therethrough.

3 Claims, 21 Drawing Figures

U.S. Patent  July 26, 1977  Sheet 1 of 4  4,037,978
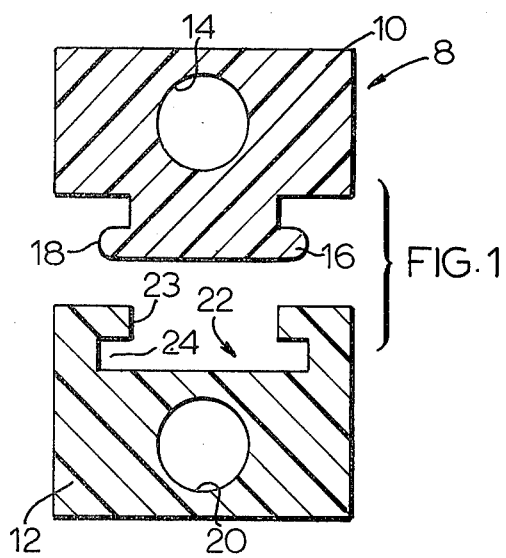
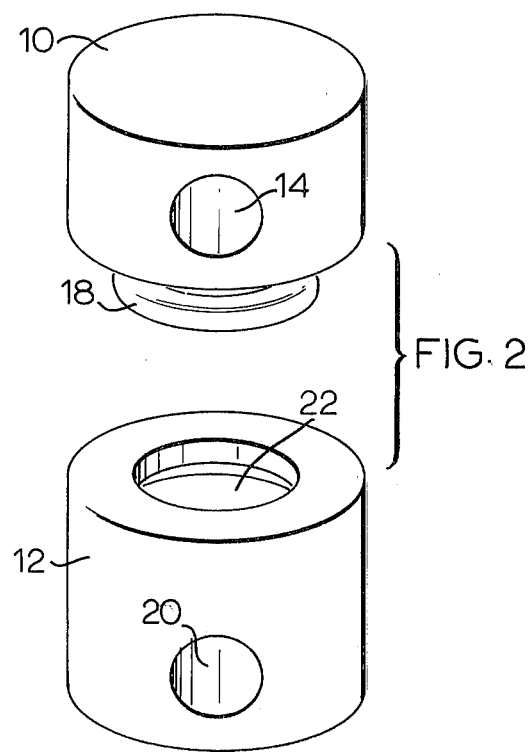
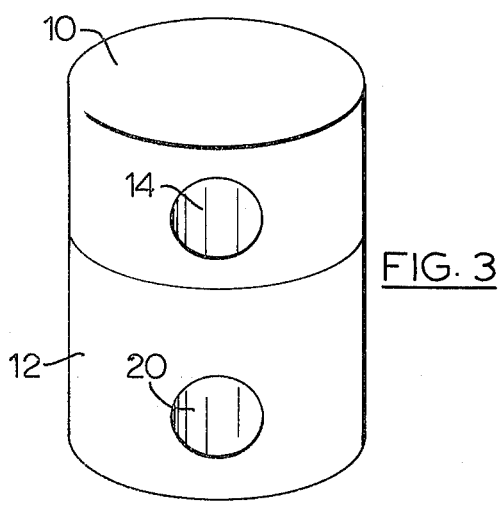
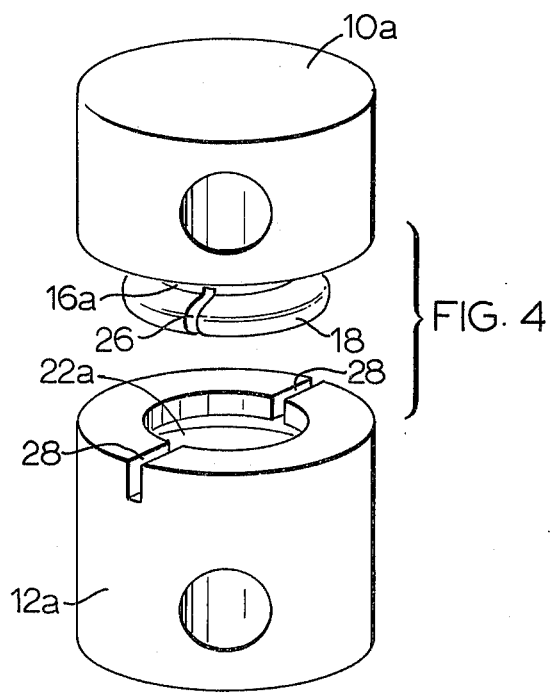
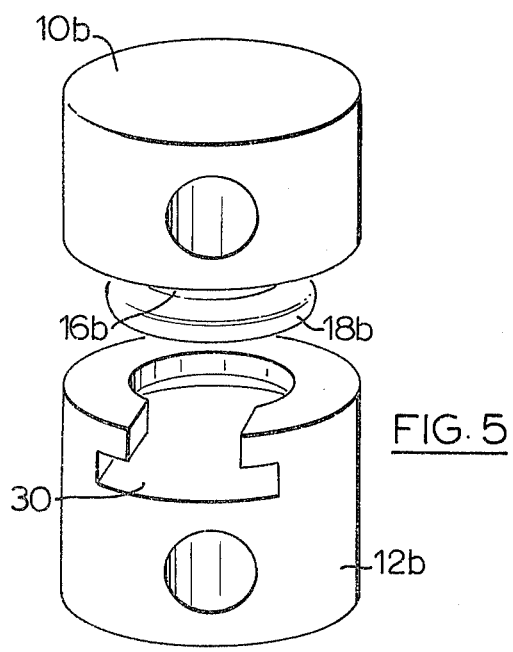

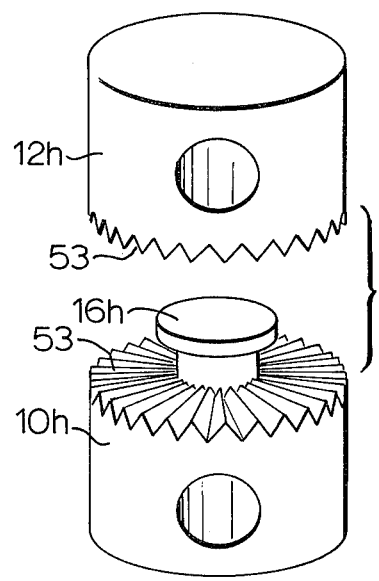
FIG. 17
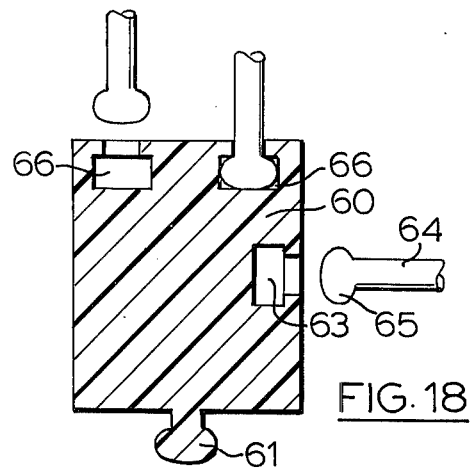
FIG. 18
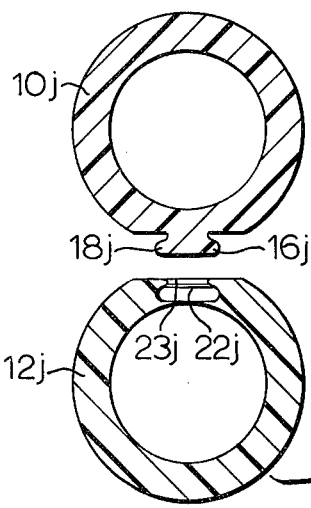
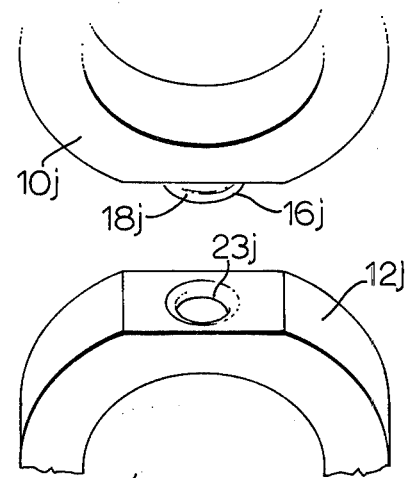
FIG. 19
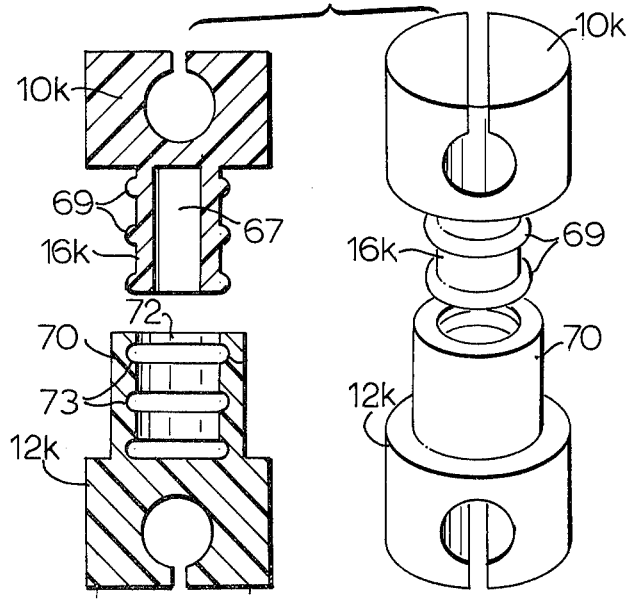
FIG. 20
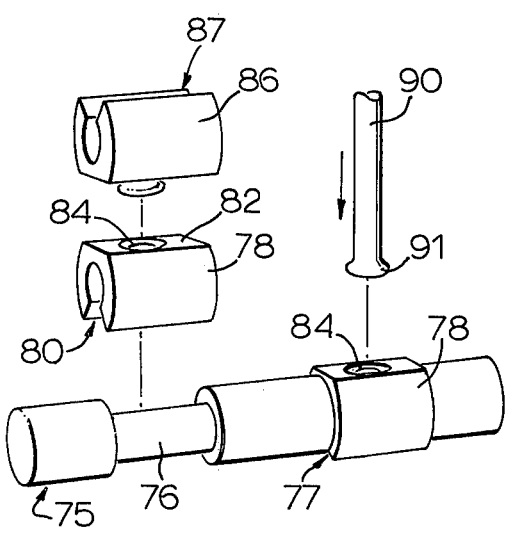
FIG. 21

RESILIENT SWIVEL CONNECTOR

This invention relates generally to improvements in contructional kits, and has to do particularly with the provision of an improved coupling member for interconnecting elongated structural members.

Accordingly, this invention provides a swivel coupling comprising: a first portion having bore means for grippingly receiving an elongated member, a second portion having bore means for grippingly receiving an elongated member, and engagement means for pivotally connecting the first portion to the second portion such that each portion is rotatable with respect to the other about an axis which is substantially normal to elongated members when received in the respective bore means.

A number of different embodiments are illustrated in the accompanying drawings, in which like numerals denote like parts throughout the several views, and in which:

FIGS. 1 and 2 are sectional and perspective views respectively of a first embodiment of this invention, prior to assembly;

FIG. 3 shows the embodiment of FIGS. 1 and 2 in assembled condition;

FIG. 4 is a perspective view of the second embodiment of this invention;

FIG. 5 is a perspective view of the third embodiment of this invention;

FIG. 4 is a perspective view of any of the previous embodiments in assembled condition;

FIG. 17 is a perspective view of the twelfth embodiment of this invention;

FIG. 18 is an axial sectional view of the thirteeth embodiment of this invention;

Figure 6:
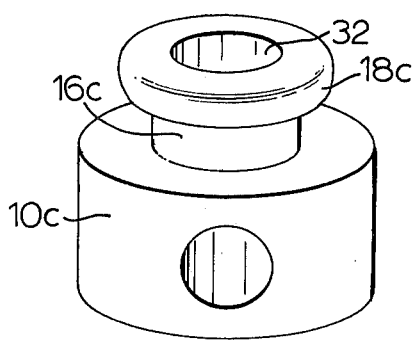
FIG. 6 is a perspective view of part of the fourth embodiment of this invention.

FIG. 19 includes an axial and perspective view of the fourteenth embodiment of this invention;

FIG. 20 is an axial and perspective view of the fifteenth embodiment of this invention; and FIG. 21 is a perspective view of the sixteenth embodiment of this invention.

Attention is now directed to FIGS. 1, 2 and 3, which show a swivel coupling 8 in accordance with the first embodiment of this invention, including a first portion 10 and a second portion 12. The first portion 10 is substantially cylindrical in configuration, and includes a diametral bore 14 passing entirely through it. The first portion 10 also includes a downward protuberance 16 which is seen to include an enlarged portion 18 at its end remote from the main body of the first portion 10. More specifically, the protuberance 16 is substantially cylindrical, and has a smoothly rounded outward lip or rim at it lower end constituting the enlargement 18.

The second portion 12 of the swivel coupling is also substantially cylindrical in configuration, and includes a diametral bore 20 therethrough. The second portion 12 defines a recess 22 which is seen to include a narrow or restricted mouth region 23 and an enlarged base portion 24. It will be readily appreciated that the first and second portions 10 and 12 are adapted to undergo snap-engagement with and disengagement from one another, to assume the connected configuration illustrated in FIG. 3. Due to the fact that, with the exception of the diametral bores 14 and 20, the portions 10 and 12 are radially symmetrical, it is possible to rotate either portion with respect to the other about an axis of rotation substantially aligned with the common cylindrical axis, i.e. in FIG. 3 a vertical line passing centrally through both portions and intersecting both of the diametral bores 14 and 20.

In order for the portions 10 and 12 to be capable of a snap-assembly into the configuration of FIG. 3, it is essential that either the protuberance 16 or the mouth 23 of the recess 22 be of resilient material. Preferably, the entirety of both portions 10 and 12 are of a suitable resilient material, such as a plastic material.

Attention is now directed to FIG. 4, which illustrates the second embodiment of this invention. The second embodiment again includes a first portion 10a and a second portion 12a, each having diametral bores as in the first embodiment, and each being substantially cylindrical in configuration.

The first portion 10a includes a downward protuberance 16a having an enlargement 18 in the form of an outward lip or rim, while the second portion 12a includes a recess 22a which, like the first embodiment, has a narrow or constricted mouth area and a broader or expanded base area. One feature distinguishing the second embodiment from the first embodiment relates to the provision, on the downward protuberance 16 of the first portion 10, of a slot 26 which extends diametrally in a plane aligned with and intersecting the axis of the cylinder defined by the portion 10a. The slot 26 provides a greater degree of flexibility and resilience in the protuberance 16a, and facilitates assembly and disassembly between the portions 10a and 12a.

A feature which distinguishes the portion 12a in the second embodiment from the portion 12 in the first embodiment is the provision of two radially oriented slots 28 passing through the restricted mouth area of the recess 22a. Again, the provision of the slots 28 provides for a greater degree of resilience and flexibility in the upper end of the portion 12a than is the case in the absence of the slots 28.

FIG. 5 illustrates the third embodiment of this invention, which includes a first portion 10b identical with the first portion 10 of the first embodiment of this invention, and which includes a second portion 12b which is similar to the second portion 12 of the first embodiment, but is distinguished therefrom by the provision of a T-shaped access slot 30 which has a lateral width slightly smaller than the outside diameter of the enlargement 18b at the bottom of the protuberance 16b on the first portion 10b, and which includes a narrower, upper part of a width slightly smaller than that of the smaller portion of the protuberance 16b. In order to assemble the portions 10b and 12b together, the protuberance 16b is aligned with the T-shaped access slot 30 in the second portion 12b, and then is moved in a radial direction toward a position of alignment between the two portions, such that the protuberance 16b passes through the T-shaped access slot 30.

FIG. 6 shows the first portion 10c of the fourth embodiment of this invention, the second portion (not illustrated) being any of the second portions already described and illustrated in connection with the previous embodiments. The first portion 10c is distinguished from the first portion 10 of the first embodiment of this invention by virtue of the incorporation, in the bottom (top in FIG. 6) of the protuberance 16c, of a depression or recess 32, for the purpose of increasing the resilience and flexibility of the protuberance 16c, and in particular the enlargement 18c thereof.

Figure 7:
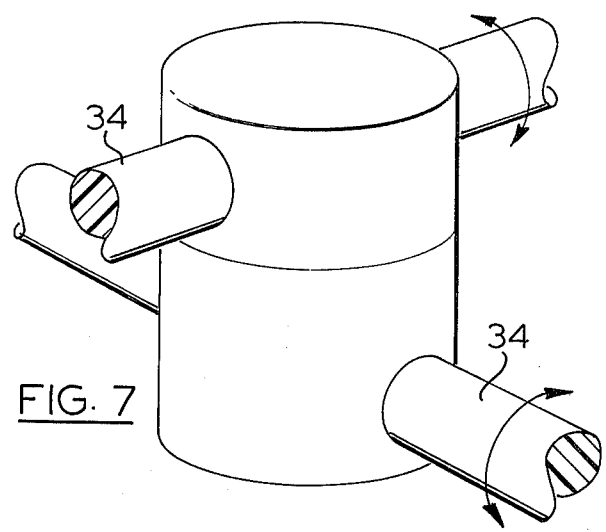

FIG. 7 may be considered to illustrate any of the embodiments already described, with the diametral bores of the two portions thereof snugly receiving respective elongated members 34. The rotary arrows in FIG. 7 show that, although the elongated members 34 are snugly received in the diametral bores, it is possible for them to be rotated about their axes. Thus, the grip between the elongated members and the respective portions of the swivel coupling is a snug grip but one that permits rotation and axial movement of the elongated members 34.

Figure 8:
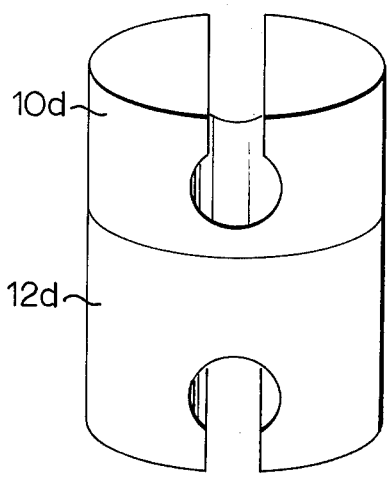
FIGS. 8, 9, 10 and 11 are perspective views fo the fifth, sixth, seventh and eighth embodiment of this invention, respectively.

Attention is now directed to FIG. 8, which shows the fifth embodiment of this invention. The fifth embodiment again includes a first portion 10d and a second portion 12d, which may be snap-fitted together by virtue of interfitting parts based on any of the previous embodiments. The feature which distinguishes the fifth embodiment from the preceding embodiments is the provision of a relatively wide slot along each diametral bore, the width of each slot being less than the diameter of the respective bore, but being an appreciable fraction of that diameter. More particularly, the slots are of such a width that the elongated members 34 shown in FIG. 7 may be moved into the bores in a direction radial with respect to the elongated members 34, rather than being inserted longitudinally (axially) into the diametral bores. This development allows a swivel coupling to be clipped or snapped onto any part of a rod without disturbing any other swivel coupling already on the rod. The sides of the slots are shown to be planar, parallel, and aligned with the central axis of the cylinder-shaped portions 10d and 12d, but these sides may be angled or curved in order to ease the clipping or snapping of the swivel coupling onto a rod or elongated member.

Figure 9:
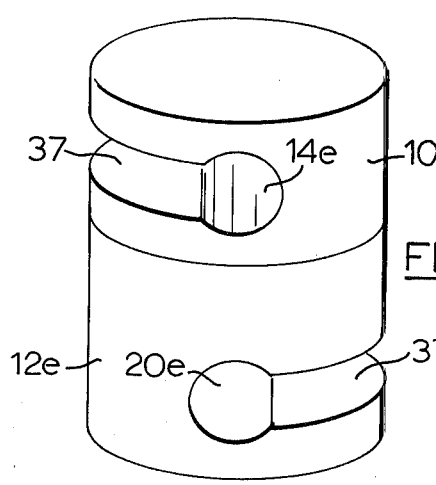

FIG. 9 shows the sixth embodiment of this invention, which includes a first portion 10e and a second portion 12e indentical to portions 10 and 12 of the first embodiment of this invention, except for the provision of lateral slots 37 aligned with an opening into the diametral bores 14e and 20e. The slots 37 are again of a width which is less than, but an appreciable fraction of, the diameter of the respective bore, thus enabling an elongated member 34 (FIG. 7) to be moved into one of the bores in a lateral direction, and also permitting a swivel coupling to be clipped or snapped onto any part of an elongated member without disturbing any other swivel coupling already on the elongated member.

Figure 10:
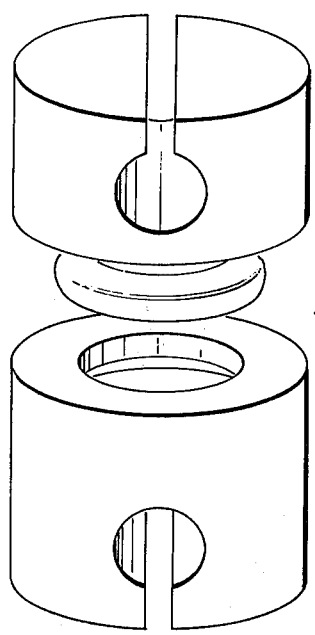

FIG. 10 shows the seventh embodiment of this invention, which is similar to the fifth embodiment, except for the width of the slots intersecting the diametral bores. In the case of the seventh embodiment, the slots are appreciably narrower, and are primarily intended to allow for expansion of the bores when rods of slightly larger diameter than the bores are inserted therein, such that the sides of the bores achieve a stronger grip on the rods (elongated members). This development also permits the manufacture of components with less precision and somewhat greater tolerance in the dimensions of the bores and the elongated members.

Figure 11:
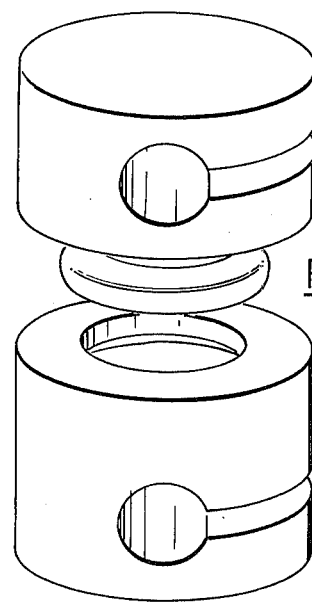

FIG. 11 shows the eighth embodiment of this invention, which is similar to the sixth embodiment of this invention, except for the width of the slots intersecting the bores. In the eighth embodiment, the slots are considerably narrower, again for the purpose of providing greater resilience and capacity for expansion in the bores.

Figure 12:
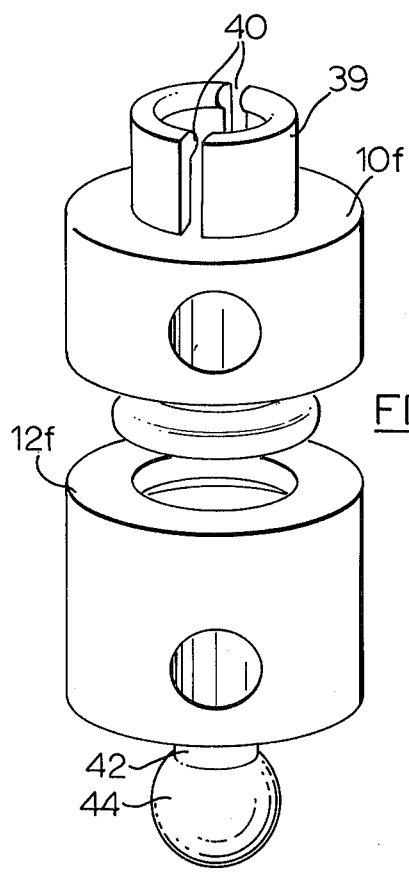
FIG. 12 is a perspective view of the ninth embodiment of this invention.

FIG. 12 shows the ninth embodiment of this invention which includes a first portion 10f and a second portion 12f which resemble the portions 10 and 12 of the first embodiment of this invention, with the exception that the first portion 10f has additional structure on its upper part, while the second portion 12f has additional structure on its lower part.

The first portion 10f includes an integral socket 39 extending upwardly from its upper part, the socket 39 defining an internal pocket with a slightly narrower mouth at the upper end, and having separations 40 in the form of antipodal slots, for the purpose of providing resilience. The second portion 12f has a downwardly extending protuberance which includes a cylindrical portion 42 and a substantially spherical portion 44.

Figure 13:
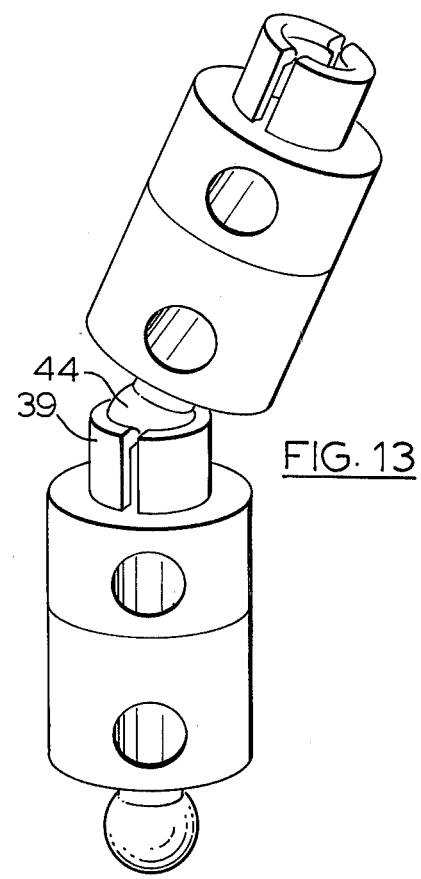
FIG. 13 is a perspective view of two couplings according to the ninth embodiment, assembled together.

FIG. 13 shows two swivel couplings each consisting of portions 10f and 12f snap-fitted together, with the spherical portion 44 of one coupling engaged with the socket 39 of the other. As can be seen in FIG. 13, the engagement of the spherical portion 44 with the socket 39 permits the upper swivel coupling to be tilted or angulated with respect to the lower swivel coupling.

Figure 14:
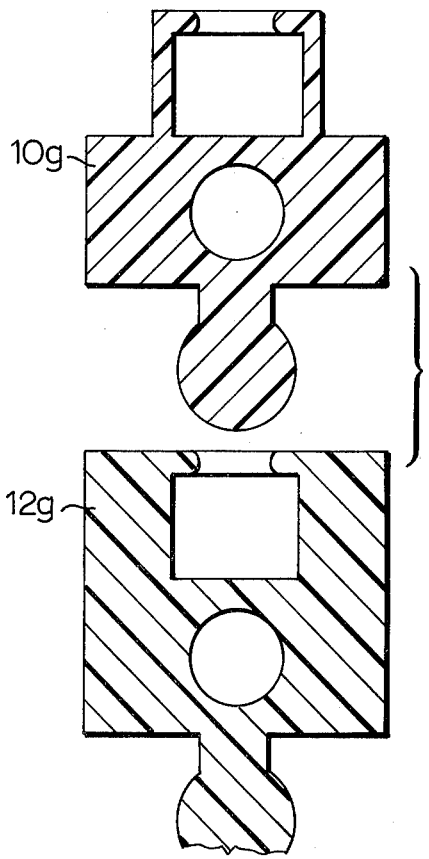
FIG. 14 is a sectional view of the tenth embodiment of this invention.

FIG. 14 is a sectional view of the tenth embodiment of this invention, which is quite similar to the ninth embodiment, except that the form of snap-engagement between the two parts of a single coupling is different from that illustrated and described with respect to the first embodiment of this invention. More specifically, the particular shape of the downward protuberance in the first portion 10g of the tenth embodiment is similar to the downward protuberance at the bottom of the second portion 12f of the ninth embodiment, and the recess in the second portion 12g is shaped so as to permit it to receive the downward protuberance at the bottom of the first portion 10g.

Because the tenth embodiment of this invention in the assembled condition is such that the cylindrical bodies of the first and second portions 10g and 12g are substantially in surface-to-surface contact, the degree of angulation or bending of the one portion with respect to the other is curtailed. Mutual rotation about the common axis, however, is permitted.

Figure 15:
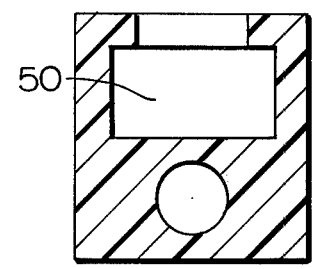
FIGS. 15 and 16 are sectional views showing the structure and function of a portion of the eleventh embodiment of this invention.
Figure 16:
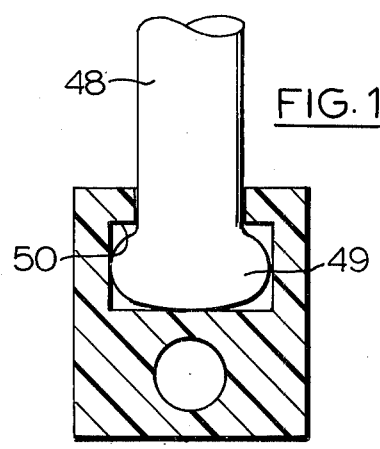

Attention is now directed to FIGS. 15 and 16, which illustrate the bottom or second portion of the eleventh embodiment of this invention. The portion illustrated in FIG. 15 is similar to the second portion 12g, except that the downward protuberance is absent. Thus, the portion illustrated in FIG. 15 could be utilized with the first portion 10g shown in FIG. 14. FIG. 16 shows that one of the elongated members 48 could be provided with an enlargement 49 at one end, the enlargement being capable of engagement in the recess 50 in the portion shown in FIGS. 15 and 16.

FIG. 17 shows the twelfth embodiment of this invention which shows a first portion 10h and a second portion 12h adapted to be snapped together. It is to be understood that the second portion 12 h has a recess adapted for snap-fitting with the protuberance 16h extending upwardly from the first portion 10h. The surfaces of the portions 10h and 12h which engage each other in the assembled condition are not smooth or flat as in the other embodiments, but instead include irregularities in the shape of radial teeth 53 which are adapted to engage in a plurality of discrete, spaced radial orientations. Thus, as torque is applied to one portion with respect to the other, there is a tendency for the portions to "jump" from one "at-rest" position to the next adjacent position.

It is also to be understood that the teeth 53 in the twelfth embodiment could be replaced by much smaller irregularities, or merely by a very roughened surface, which would no longer define discrete "at-rest" positions, but would provide for a high degree of frictional grip between the two portions, such as to tend to make the portions remain in a given radial orientation, once placed in that given radial orientation.

FIG. 18 illustrates the thirteenth embodiment of this invention and shows only one portion 60 of a swivel coupling, which includes an axial, downward protuberance 61 for engagement with another portion having a suitable recess. The portion 60 includes a lateral recess 63 which may receive the end of an elongated member 64 having an enlargement 65 on its end, and includes one or more other recesses shown by the numeral 66, also capable of receiving elongated members with enlarged ends. The recesses 66 may be arranged as a "ring" of recesses in the upper surface of the portion 60, all equidistant from the center point.

FIG. 19 shows the fourteenth embodiment of this invention, which includes a first portion 10j and a second portion 12j, each in the general shape of an annular ring of substantially rectangular section. The first portion 10j has a downward protuberance 16j with an enlargement 18j at its bottom end, while the second portion 12j has a recess 22j which opens through to the center of the annular ring, and which has a narrow or restricted mouth area 23j and a larger base portion as illustrated. FIG. 19a shows the portions in section, while FIG. 19b shows the portions in perspective.

FIG. 20 shows the fifteenth embodiment of this invention in section and in perspective. The fifteenth embodiment includes a first portion 10k and a second portion 20k, each having a diametral bore with a narrow slot aligned with the bore and aligned with the cylindrical axis of the respective portion, thereby to lend increased resilience to the bore and its ability to grip an elongated member. The first portion 10k includes a cylinder-like protuberance 16k having a hollow center 67, and having a plurality of external annular ribs 69.

The second portion 20k in FIG. 20 includes an upward cylindrical extension 70 having a hollow interior 72 and having a plurality of internal circular channels or recesses 73 adapted to match and snugly receive the ribs 69 on the first portion 10k. The manner of snap-fit assembly between the two portions is obvious from the illustration of FIG. 20, and it will further be appreciated that the provision of the ribs 69 at uniform spacing from one another enables the first portion 10k to be snapped into the second portion 12k at several different axial positions, corresponding to the engagement of the lowermost rib 69 into the upper, the middle or the lower annular recess 73.

Attention is now directed to FIG. 21, which illustrates the sixteenth embodiment of this invention.

In FIG. 21 there is shown an elongated element 75 of relatively large diameter, the element 75 containing two integral cylindrical portions of reduced diameter, one of these being shown by the numeral 76, and the other being in the location indicated by the arrow 77 but not visible because of the presence of a snap-on coupling portion 78 now to be described. As seen, the coupling portion 78 is similar to the element shown in FIG. 19, with the exception that the annulus is broken or interrupted by a gap 80, best seen in the lower, left-hand representation of the coupling portion 78 which is spaced above the elongated member 75. The coupling portion 78 has a flat upper surface 82 in which is provided an opening 84 the axial section of which is the same as that of the recess 22j in FIG. 19 (a).

Illustrated above the coupling portion 78 at the left in FIG. 21 is a further, mating portion 86 which is similar to the first portion 10j illustrated in FIG. 19(a), except for a gap 87. The portions 78 and 86 are intended to be snap-fitted together exactly as the portions shown in FIG. 19, and may be separated by pulling apart. The flat surfaces of the portions 78 and 86 which are parallel and face each other are adapted to be in substantial contact when the portions 78 and 86 are snapped together.

It will be appreciated that each of the portions 78 and 86 may be snap-fitted onto one of the reduced-diameter regions (76, 77) of the elongated member 75. The rightward coupling portion 78 in FIG. 21 is shown in its snapped-on, engaged position.

Shown at the upper right in FIG. 21 is the end portion of a second, smaller-diameter elongated member 90 which is provided with an enlargement 91 on its end, the enlargement 91 being adapted for snap-fitting into the recess 84. It will be appreciated that the elongated member 90, when snapped into position in the portion 78, may rotate about its axis. Similarly, the elongated member 75 may be rotated with respect to the portions 78. The portions 78 are, of course, maintained in a fixed longitudinal position on the elongated element 75 due to the reduced-diameter regions described.

It will thus be seen that this invention has provided a swivel coupling including portions adapted to engage and swivel with respect to each other, and adapted to receive an elongated member at an angle to the axis of swiveling. While it can be of advantage for some uses to arrange for the bore in each portion to intersect perpendicularly the axis of rotation of that portion with respect to the other, it will be understood that this is not essential to the invention. The bore may be arranged at angles other than 90° to the swivel axis, and may pass eccentrically of the swivel axis (i.e. not intersect).

Also, while the bore has been shown in each instance to be circular in cross section, primarily because an elongated member would typically be of cylindrical construction, it must be understood that other cross sections could be used. For example a square, rectangular or other polygonal section may also be utilized.

The preferred manner of construction of the different parts of this invention involves the utilization of a suitable resilient material such as plastic, since this facilitates the snap-fit between the parts and the resilient gripping between each portion and the elongated member. Also in the preferred manner of construction, each portion would be a single integral moulding.

While the cylindrical bores are generally illustrated to pass completely through their respective portions, it will be understood that this need not always be the case, and indeed blind bores may be utilized to advantage.

In some embodiments illustrated and described above, each portion is provided with a surface lying in a plane at right angles to the axis of rotation of that portion with respect to the other, and the surfaces of the two portions are intended to abut each other such that tilting movement of one portion with respect to the other is restricted. Conceivably, these surfaces could be on the portions which combine to form the snap-fit. Thus, such portions may comprise a disc received within a socket or recess, with the mating surfaces being formed by a face of the disc and a part of the socket or recess.

It may also be of advantage to have the "tilt-restricting" surfaces formed on the periphery of each part.

It will also be seen that at least some of the embodiments are such as to accommodate parts or portions in addition to the two comprising the basic swivel coupling. Thus a composite coupling member could be constructed of three parts all rotatable with respect to each other, or two swivel couplings could be connected together so as to include four portions in all.

In most of the embodiments illustrated and described above, the portions of the swivel coupler are cylindrical in configuration. It will be understood, however, that the coupling portions may assume any of a variety of outward configurations, including those of a prism, a rectangular parallelepiped, and other polyhedral shapes. In FIG. 20 of the drawings, the fifteenth embodiment of the invention has a plurality of external annular ribs 69 around the cylinder-like protuberance 16k. It will be understood that one or more of such ribs 69 may be utilized, since a single rib would suffice for the purpose intended. In the case where a single rib is provided, it would normally be the rib furthest from the main body of the portion 10k.

In use, a plurality of swivel couplings as provided herein may be utilized in conjunction with rods or tubes to form a variety of multi-planar structures. Each plane can form and define a single geometric shape, joining the next by means of swivel couplings and rods in a series of lateral or axial progressions.

A construction system utilizing swivel couplings according to this invention has special but by no means exclusive application to structures of small proportions such as a constructional toy system, a geometric educational aid, or an architectural model system.

It will be understood that this invention includes the provision of a construction kit comprising a plurality of swivel couplings as described above and two or more elongated members adapted to cooperate with the swivel couplings.

What is claimed is:
1. A swivel coupling comprising:
a first resilient portion and a second resilient portion, the first portion being solid except for a first bore provided therethrough for grippingly receiving a cylindrical elongated member,
the second portion being solid except for a second bore provided therethrough for grippingly receiving an elongated member,
each portion defining a slot having a width less than the diameter of its respective bore, the slot being aligned with and extending radially from its respective bore and extending to the outer surface of the respective portion,
and interlocking engagement means for pivotally connecting the first portion to the second portion such that each portion is rotatable with respect to the other about an axis which is substantially perpendicular to elongated members when received in the respective bores.
2. The invention claimed in claim 1, in which each portion is substantially cylindrical, in which each bore extends completely through its respective portion perpendicular to the cylindrical axis thereof, and in which the slot of each portion extends along a plane transverse to the axis of the portion.
3. The invention claimed in claim 1, in which each portion is substantially cylindrical, in which each bore extends completely through its respective portion perpendicular to the cylindrical axis thereof, and in which each slot extends from its respective bore along a plane which contains the cylindrical axis of the respective portion.

* * * * *